United States Patent [19]

Mazur et al.

[11] Patent Number: 4,597,048
[45] Date of Patent: Jun. 24, 1986

[54] DIGITAL FLOW REGULATION OF LIQUID-LEVEL CONTROL FOR A CONTINUOUS CASTING MOLD

[75] Inventors: Chester C. Mazur, White Oak; James H. Wilson, Export, both of Pa.

[73] Assignee: United States Steel Corporation, Pittsburgh, Pa.

[21] Appl. No.: 530,164

[22] Filed: Sep. 7, 1983

[51] Int. Cl.⁴ .................... G06F 15/46; G06G 7/64
[52] U.S. Cl. .................... 364/472; 364/476; 364/510; 318/599; 164/4.1; 164/155; 164/449; 73/295; 137/412
[58] Field of Search ............... 364/472, 476, 509, 510; 73/295, 204; 164/449, 155, 4; 137/412, 413; 318/599

[56] References Cited

U.S. PATENT DOCUMENTS

| 3,358,743 | 12/1967 | Adams | 164/449 |
| 3,536,124 | 10/1970 | Hanas | 164/449 X |
| 3,627,021 | 12/1971 | Schultz | 364/472 |
| 3,874,407 | 4/1975 | Griswold | 318/599 |
| 3,946,795 | 3/1976 | Bruderer et al. | 164/155 X |
| 3,962,620 | 6/1976 | Dion | 318/599 |
| 4,077,457 | 3/1978 | Hashio et al. | 164/155 X |
| 4,084,120 | 4/1978 | Lund | 318/599 |
| 4,158,162 | 6/1979 | Hawkins | 318/599 |
| 4,186,792 | 2/1980 | Yamada et al. | 164/449 |
| 4,236,106 | 11/1980 | Davis et al. | 318/599 |
| 4,237,960 | 12/1980 | Perratore et al. | 164/449 X |
| 4,320,656 | 3/1982 | Tiskus | 73/295 |
| 4,392,523 | 7/1983 | Beller et al. | 164/155 |

Primary Examiner—Jerry Smith
Assistant Examiner—John R. Lastova
Attorney, Agent, or Firm—William F. Riesmeyer, III

[57] ABSTRACT

In a continuous casting apparatus, the level of liquid in the mold is monitored and compared to a desired reference level. A microcomputer examines the resulting error signal and determines the amount of movement of the valve which would be appropriate to correct the detected error. A control pulse is then generated having a duration corresponding to the desired movement distance, and the valve is adjusted accordingly.

7 Claims, 6 Drawing Figures

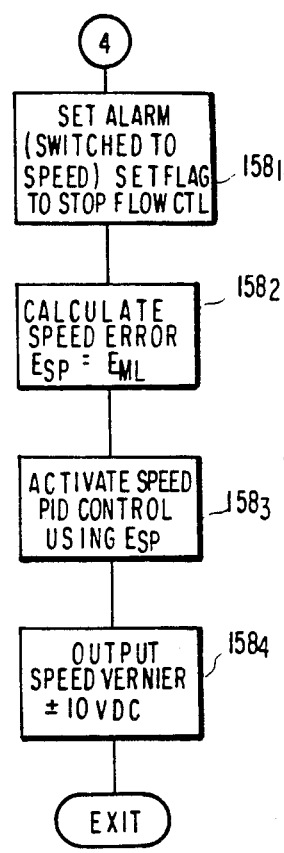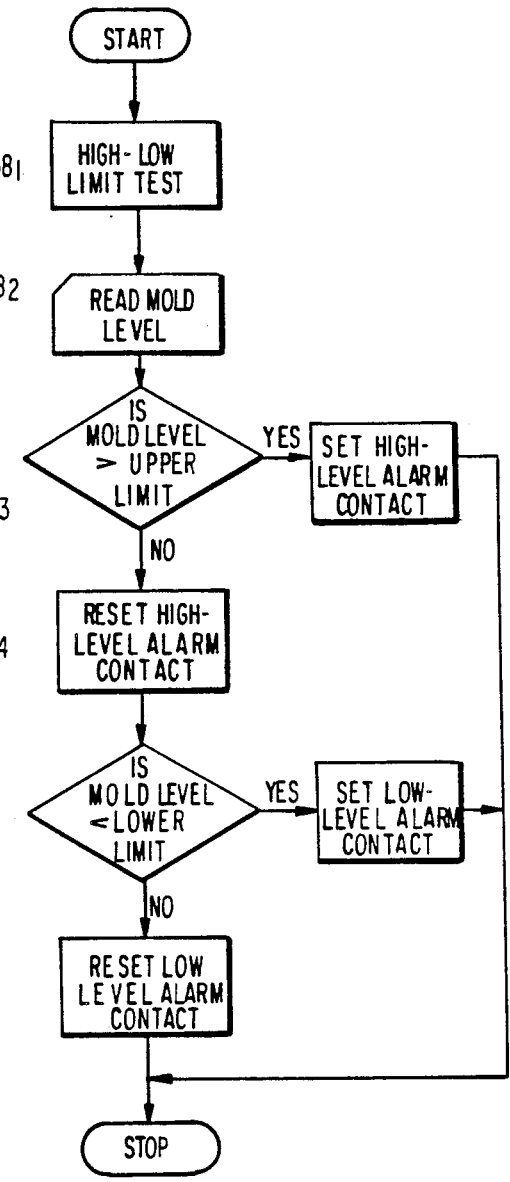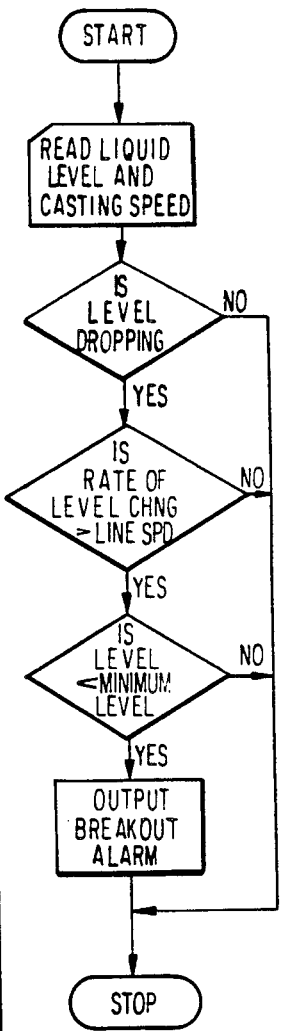

DIGITAL FLOW REGULATION OF LIQUID-LEVEL CONTROL FOR A CONTINUOUS CASTING MOLD

BACKGROUND OF THE INVENTION

This invention relates to continuous casting systems, and more particularly to a method and apparatus for controlling the molten liquid level in a continuous casting mold.

In a conventional continuous casting system, a plug or "dummy bar" is inserted through the bottom of an open-bottomed mold, and molten metal is then poured into the mold. The mold side walls are typically water-cooled, and the molten level cools significantly faster around the periphery of the mold. As the metal begins to solidify, a skin develops around its periphery and the plug is slowly withdrawn from the bottom of the mold. As the metal strand is withdrawn from the bottom of the mold, molten metal is continuously poured into the top of the mold, and a long strand of casting can be obtained from a relatively small mold.

In such continuous casting systems, it is important to maintain the level of molten liquid in the mold within some predetermined range. Obviously, it would be undesirable to have the mold become empty or to have the mold overflow, but level control on a much finer scale is also desirable. The quality of the cast steel can be enhanced by maintaining the molten liquid within the mold at some optimum level, and a variety of level control techniques have been used. There are two factors which can be controlled in order to maintain a desired liquid level within the mold, the rate at which the metal strand is withdrawn from the mold and the rate at which the liquid metal is poured into the mold. The withdrawal rate can be controlled by adjusting the casting speed, and the flow rate into the mold can be controlled, e.g., by adjusting a tundish throttle gate through which the liquid metal is poured. Different systems may control either one of these two factors, and some systems may use a combined control of both factors.

U.S. Pat. No. 2,832,110 issued to Carleton on Apr. 29, 1958, discloses a technique of manual operator control over the flow rate of liquid metal into the mold. Due to problems of operator error and fatigue, however, such manual control techniques have typically been replaced with automatic control. U.S. Pat. No. 4,306,610 issued to Ahmed on Dec. 22, 1981, U.S. Pat. No. 4,222,506 issued to Sakashita et al on Sept. 16, 1980, and U.S. Pat. No. 3,884,288 issued to Berry on May 20, 1975 all teach techniques of controlling the liquid level within the tundish, to thereby control the flow rate of molten liquid into the mold.

U.S. Pat. No. 4,019,562 issued to Shiraiwa et al on Apr. 26, 1977 discloses a technique for monitoring the rising rate of liquid level within the mold and controlling a tundish throttle gate valve to correspondingly control the rate of liquid flow into the mold.

U.S. Pat. No. 3,519,060 issued to Vischulis on July 7, 1970 discloses a technique in which the level of liquid within the mold is monitored to generate a control signal to an appropriate servo mechanism to control the rate at which liquid is poured into the mold. The Vischulis system utilizes a feedback-type servo loop for its control, and may exhibit an undesirably slow response time.

More recently, U.S. Pat. No. 4,226,278 issued to Osugi on Oct. 7, 1980 discloses a system wherein a plurality of thermocouple devices are used to detect the level of molten liquid within the mold, and a servomechanism including a microcomputer or the like incrementally opens or closes the tundish throttle gate in order to increase or decrease, respectively, the rate of liquid flow into the mold. The Osugi system merely detects when the mold level exceeds upper or lower limit values, with the control system being designed to fully open or fully close a valve momentarily to correct the level when it exceeds one of the limit values. The Osugi system is not apparently capable of the degree of highly accurate level control desired in current casting systems.

U.S. Pat. No. 3,300,820 issued to Tiskus and Wilson on Jan. 31, 1967 discloses a flow control system wherein liquid metal is poured directly from the ladle into the mold rather than through the intermediary of a tundish. In this system, mold level control is accomplished by monitoring the mold level and automatically manipulating a ladle stopper rod to control the rate at which the molten steel is poured into the mold. The throttle gate control signal in the '820 patent is generated by charging a capacitor with a signal proportional to the mold level error signal, so that larger mold level errors will result in faster charging of the capacitor. When the capacitor is charged to a predetermined level, a control pulse of constant duration is generated. The system will continue to generate these control pulses until the mold level error disappears.

The most significant drawback of this system is that, since each control pulse moves the throttle gate by a predetermined amount, the amount of adjustment to the throttle gate will depend upon the number of pulses generated. The speed with which an adjustment can be made will therefore depend upon the maximum frequency with which the pulses can be generated and also the maximum frequency with which the electromechanical throttle mechanism can be controlled. This results in an undesirable limitation on the responsiveness of the control system.

Recent studies have indicated that internal and surface imperfections in continuously-cast steel can be minimized by employing constant speed casting while also reducing the amplitude of mold level variations to approximately ±3 mm or less. In order to maintain such stringent mold level requirements, a more accurate mold level control system capable of quick response to minute level variations would be desired.

SUMMARY OF THE INVENTION

It is therefore an object of the present invention to provide a mold level control system for a continuous casting apparatus which permits constant speed casting while maintaining highly accurate control over the level of liquid metal in the mold.

It is a further object of this invention to provide such a system which is not limited in its response time by the frequency at which the electromechanical throttle mechanism can be controlled.

Briefly, the control system according to the present invention monitors the mold level and generates a control signal representing the distance and direction which the tundish throttle gate must be moved from its present position to implement a desired degree of adjustment to the rate of liquid flow into the mold. The control signal is then converted into a pulse having a width corresponding to the desired degree of adjustment. The electromechanical adjustment mechanism is designed to move the throttle gate at a substantially constant rate in response to the presence of a pulse, so that control of the pulse width can be used to control the total adjustment amount.

Calculation of the pulse-time duration is preferably accomplished using the classical velocity form of the proportional, integral and derivative (PID) digital-control algorithm.

With the method according to the present invention, there is no need for throttle-gate position measurement or feedback, nor is there any need for a servo system associated with the throttle gate position control. The algorithm used to calculate the pulse time duration can include the addition of some value to compensate for an anticipated propagation time of the throttle gate control pulse through the interface between the microprocessor and the final control element (e.g. throttle gate), such as interposing relays, hydraulic-cylinder solenoids, electric drives, etc. There may also be included in the algorithm some means for compensating for any predictable freeplay, backlash or hysteresis in the throttle gate mechanism associated with changes in the direction of movement.

BRIEF DESCRIPTION OF THE DRAWINGS

The invention will be more clearly understood from the following description in conjunction with the accompanying drawings, wherein:

FIG. 4 is a flow chart illustrating a casting speed control program performed by the system according to the present invention;

FIG. 5 is a flow chart illustrating a high-low alarm limit program performed by the system according to the present invention; and FIG. 6 is a flow chart illustrating a breakout alarm program performed by the system according to the present invention.

DETAILED DESCRIPTION OF THE PREFERRED EMBODIMENT

Figure 1:
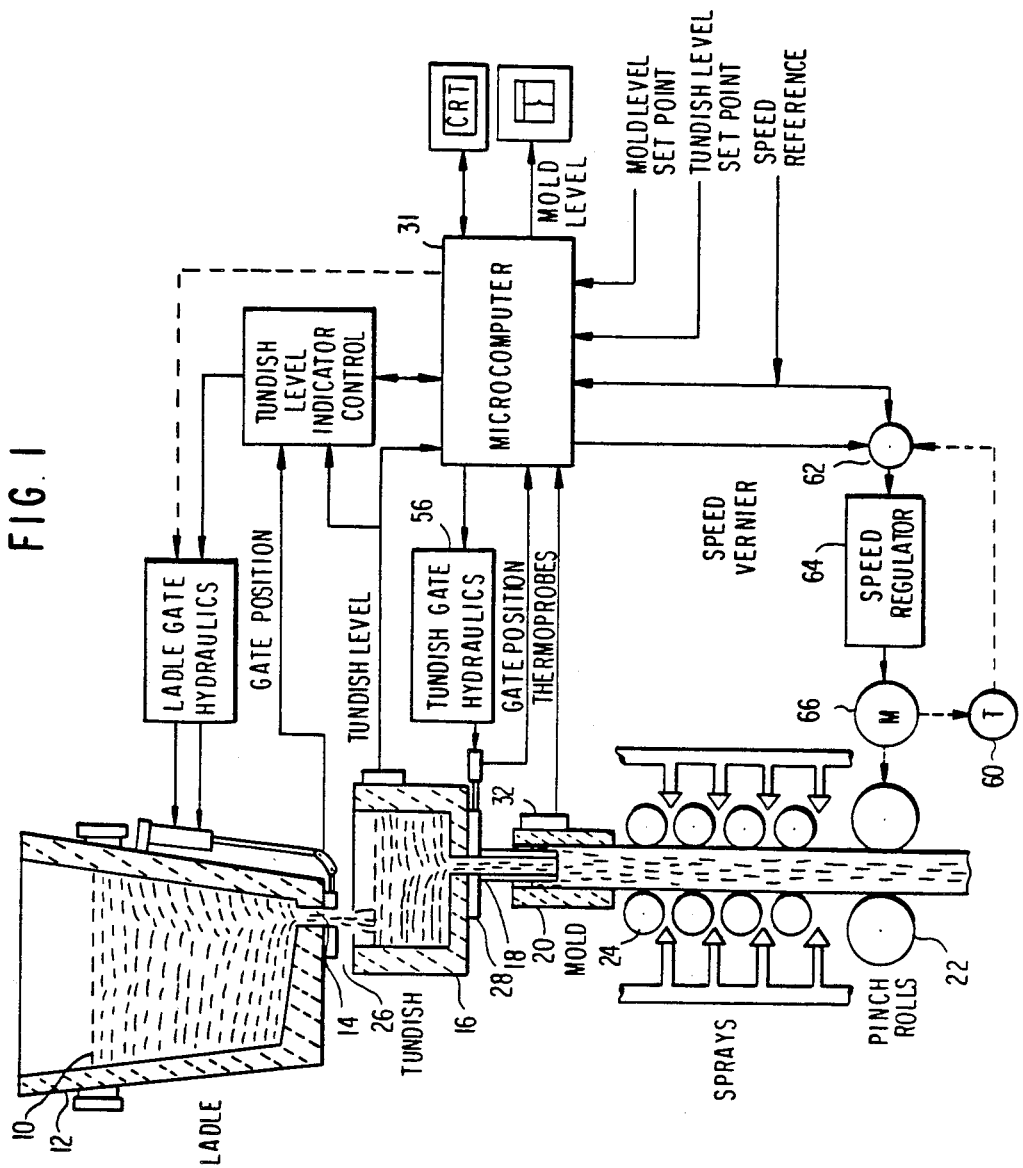
FIG. 1 is a system diagram illustrating the overall arrangement of a continuous casting apparatus according to the present invention.

The overall arrangement of the control system according to the present invention is illustrated in FIG. 1. Molten metal liquid 10 is contained within a ladle 12 and is provided through an opening 14 into a tundish 16. The tundish 16 has an opening 18 through which the liquid metal is poured into the mold 20. The metal begins to solidify in the mold and is continuously drawn out of the mold by pinch rolls 22. The strand is guided to the pinch rolls 22 via idling rolls 24, and the exterior of the strand is sprayed to enhance cooling and solidifying prior to engagement with the pinch rolls 22.

Both the ladle and tundish are illustrated as being provided with throttle gates, a throttle gate 26 for controlling the aperture through which liquid is poured into the tundish, and a throttle gate 28 for controlling the aperture through which liquid is poured from the tundish into the mold. It should be appreciated, however, that only the latter throttle control gate is required to practice the technique according to the present invention.

The control system according to this invention can be operated in any one of three modes. In a first mode, the casting speed can be maintained constant while the flow of liquid steel into the mold from the tundish is regulated via the throttle gate 28 in order to maintain a constant mold level. In a second mode, the flow of liquid metal into the mold can be maintained constant, while the casting speed is regulated to maintain the desired mold level. In a third mode, the tundish flow and casting speed controls can be combined, e.g. with the flow rate of steel into the mold being regulated to maintain a constant level and the casting speed being adjusted only when the mold level exceeds some preset limit or limits. The preferred embodiment employs this third control method, and will be described in that context.

Figure 2:
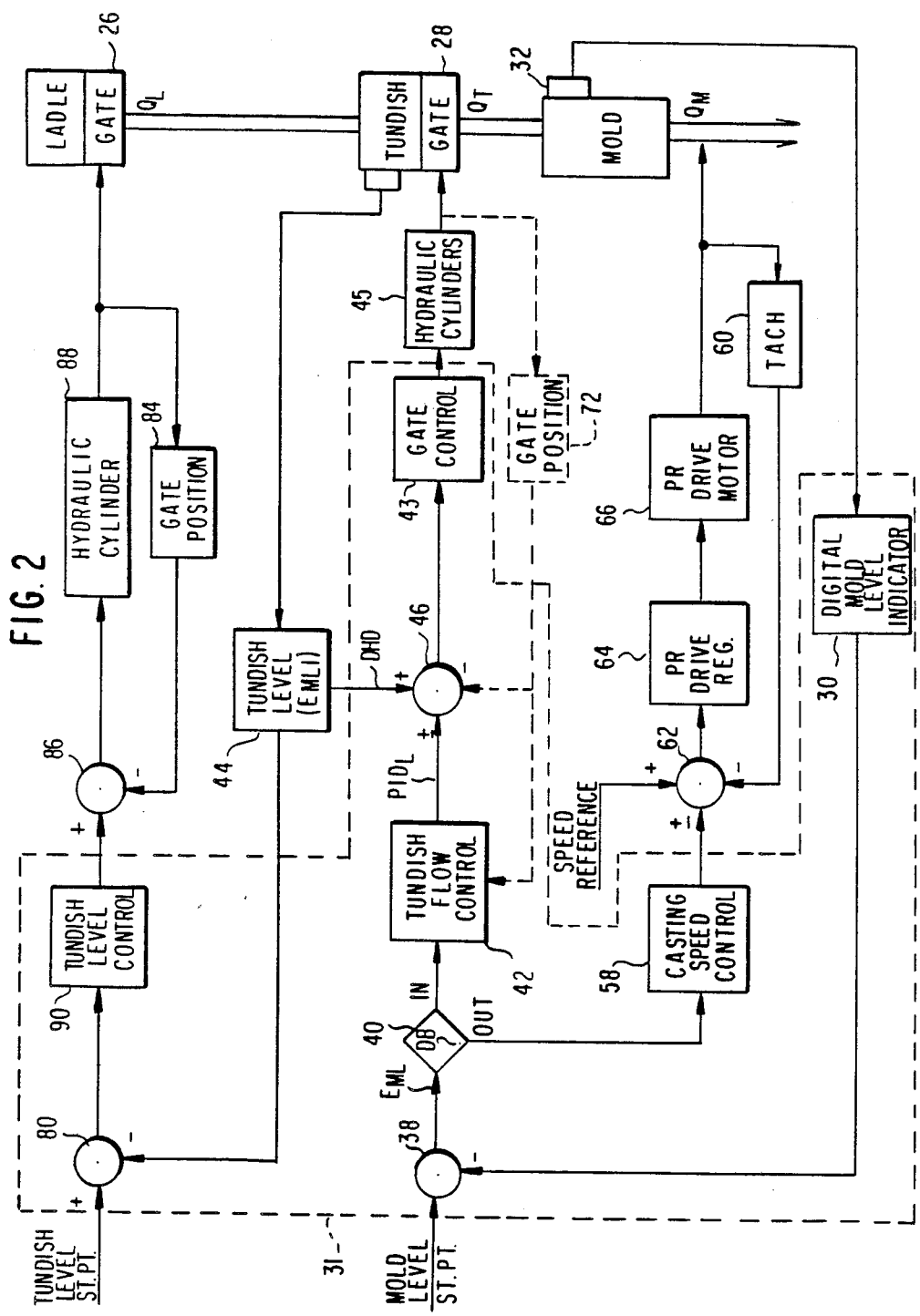
FIG. 2 is a functional block diagram illustrating the operation of the control system according to the present invention.

Referring now to FIG. 1, and to FIG. 2 which illustrates the operation of the control system in more detail, a mold level measurement is obtained from a digital liquid-level indicator 30. The output from the mold level indicator 30 is then compared in comparator 38 with a mold level set point signal representing the desired level of liquid within the mold. The polarity and magnitude of the output signal from comparator 38 will therefore indicate the direction and amount, respectively, by which the actual mold level differs from the desired mold level.

A comparator 40 then examines the error sighal $E_{ML}$ to determine if the error signal has exceeded a predetermined limit or limits. If not, a tundish flow control circuit 42 calculates a value corresponding to a desired movement distance for the throttle gate 28 which will be necessary to correct the detected mold level error. This signal is then provided to a gate control circuit 43 for generation of a control pulse having a duration corresponding to the desired amount of throttle gate movement, and the control pulse is then provided to hydraulic cylinders 45 for moving the gate 28 through the appropriate distance. If desired, the liquid level in the tundish can be monitored in a tundish level monitor 44, and the calculated signal at the output of tundish flow control circuit 42 can be adjusted at 46 to take into account the present value and direction of change of the liquid-level head in the tundish. The flow rate out of the tundish is a function of both throttle gate opening and liquid-level head in the tundish. The corrected value can then be provided from the output of combiner 46 to the gate control circuit 43 for generation of the appropriate control pulse width.

If the detected mold level error signal $E_{ML}$ exceeds the limit values, the first mode of automatic level control (flow regulation) may be malfunctioning, and the casting speed can be adjusted in an attempt to bring the mold level within the limit values. To this end, a casting speed control circuit 58 can be used to generate an adjustment signal corresponding to the detected error signal $E_{ML}$. Under normal conditions, the strand withdrawal rate, i.e. the casting speed, is controlled by a servo loop comprising tachometer 60 for generating a signal corresponding to the actual casting speed, a comparator 62 for comparing a speed reference value with the detected speed value to generate an error signal, a drive regulator 64 responsive to the output of the comparator 62 for generating a drive voltage, and a drive motor 66 responsive to the output from the circuit 64 for driving the pinch rollers to control the casting speed. When automatic speed control is to be implemented after the mold level error exceeds its limit value, the casting speed control circuit 58 will provide its adjustment value to the comparator 62 to provide an offset to the servo loop and thereby increase or decrease the casting speed as appropriate.

The level of the liquid in the tundish may also be controlled, to maintain constant head, by a separate servo loop including level monitoring circuitry 44, a comparator 80 for comparing the detected tundish level to a desired set point level, and a tundish level control circuit 90 for generating a signal corresponding to a desired change in the position of the ladle throttle gate 26. The level control circuit 90 normally provides to one input of a comparator 86 a signal corresponding to the desired position of the throttle gate 26, and a gate position monitoring circuit 84 provides a second input to the comparator 86 indicating the actual position of the gate. Hydraulic cylinders 88 are then driven in accordance with the output from the comparator 86 to stabilize the gate 26 at the desired position. When an output is provided from the comparator 80, the level control circuitry 90 will adjust its reference signal accordingly.

While the invention may be arranged with the components illustrated in FIG. 2, the preferred embodiment of the invention utilizes a microcomputer 31 for system control. The microprocessor chip may be a 6502 chip available from IPAC Corporation, of Bethel Park, Pa. The microcomputer 31 in FIG. 1 will preferably perform, either by dedicated hardware or software, the functions of the components enclosed in the dotted outline 31 in FIG. 2, and may follow programs such as illustrated in flow chart form in FIGS. 3–6.

Figure 3:
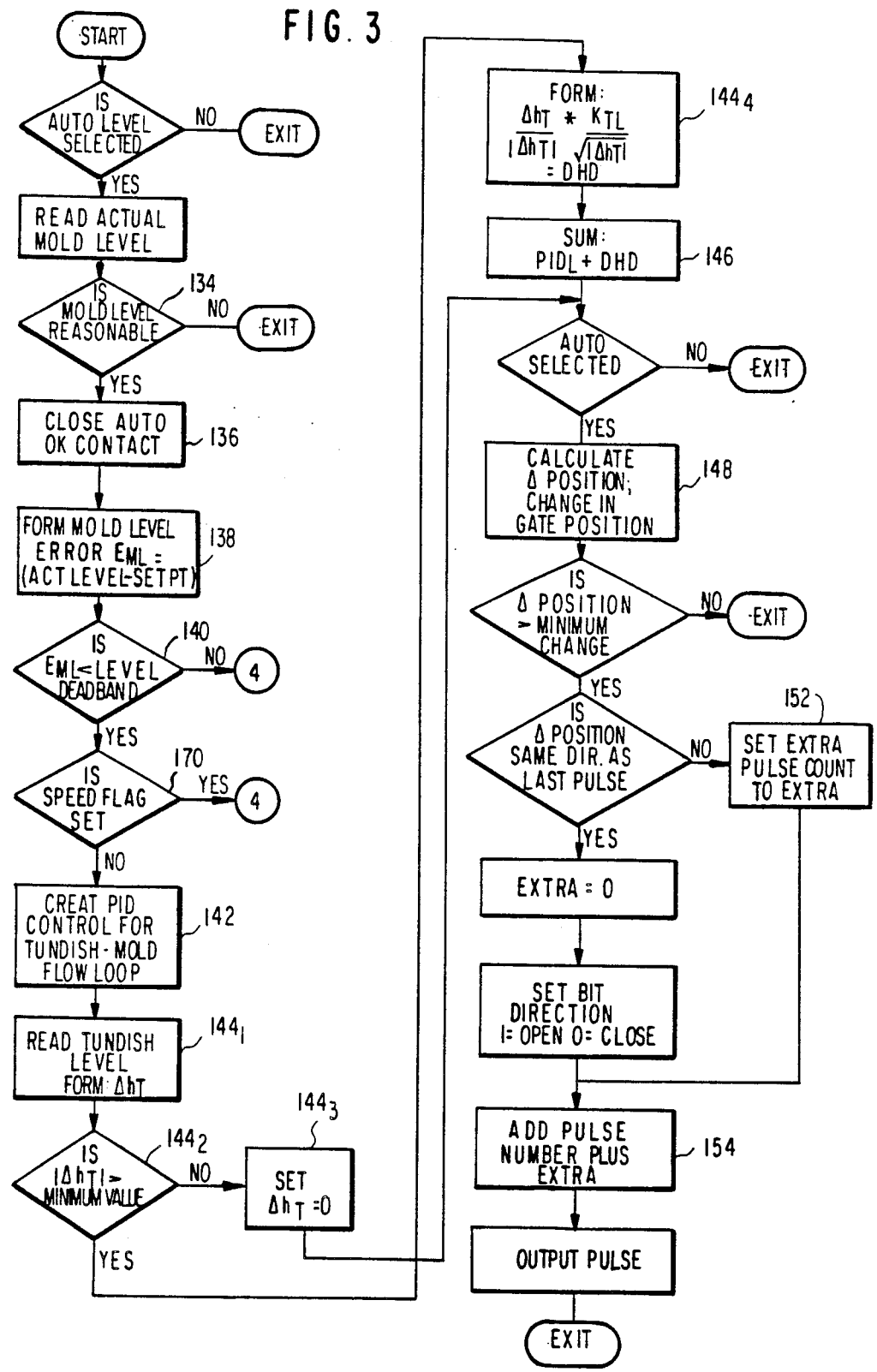
FIG. 3 is a flow chart illustrating a flow control program performed by the system according to the present invention.

First, as shown in FIG. 3, the microcomputer detects whether the automatic level-control mode has been requested. If not, there is no automatic control operation to be performed. If automatic control has been selected, the microcomputer reads the actual mold level by detecting the outputs from the various thermocouple devices 32 around the mold. If the mold level indication is unreasonably high or low, there is some malfunction which has resulted in either an abnormal mold level or an incorrect mold level detection, and in either case the program is exited at step 134 in FIG. 3. In this case, the automatic control indicator light on the operator panel will not be illuminated.

If the detected mold level is reasonable and the microcomputer is operating properly, the microcomputer will acknowledge the automatic control request by closing the "auto OK" contact at step 136. A mold level error signal will then be generated in accordance with the difference between a set point signal representing a desired level and a signal proportional to the actual liquid level in the mold at step 138. The mold level error signal $E_{ML}$ is then examined to determine whether it has exceeded a predetermined limit or limits at step 140. If the error signal $E_{ML}$ has not exceeded its limit(s), flow regulation continues while maintaining a constant casting speed. The microcomputer then employs a flow control algorithm to calculate an output based on the sums of the proportional, integral and derivative (PID) functions of the error and a value that is proportional to the reciprocal of the square root of the change in the tundish liquid-level head (if this signal is available). More particularly, the microcomputer at step 142 calculates a value FO corresponding to a pulse time duration, and a suitable form of the algorithm would be as follows:

$$FO = KG[(E2-E2)+KI(E1)+KD(E1-2E1+E3)],$$

where:
FO is a count output such as $1, 2, 3, \ldots, n$,
E1 is the present computer-scan mold-level error,
E2 is the previous computer-scan mold-level error,
E3 is the mold-level error previous to E2,
KG is the controller proportional-gain factor,
KI is the controller integral-gain factor, and
KD is the controller derivative-gain factor.

It should be appreciated that other algorithms could be used instead of that defined above without departing from the spirit and scope of the invention.

Although it is not essential to the operation of the present invention, it is preferable to take into account the direction in which the level of liquid in the tundish is changing. To this end, the microcomputer at step $144_1$ in FIG. 3 reads the present tundish level and compares it to the previous tundish level to obtain a tundish level change signal $\Delta h_T$. If the detected change is determined at step $144_2$ to be negligible, the change is assumed at step $144_3$ to be zero. On the other hand, if the change is large enough so that it should be considered in generating the appropriate control signal, a signal DHD is calculated at step $144_4$ according to the equation shown in FIG. 3 to represent a direction of change as well as a value representing the square root of $h_T$, where $h_T$ is the present height of the liquid level in the tundish. All of steps $144_1$–$144_4$ are performed between the blocks indicated by reference numerals 44 and 46 in FIG. 2.

The calculated FO and DHD signals are then combined at step 146, and the result is then used at step 148 to generate a signal representing the amount of change desired in the throttle gate position. At step 150 the microcomputer examines the calculated change value to determine if it is greater than some minimum amount which warrants an adjustment of the throttle gate position. If not, the microcomputer exits the program at this point. If the calculated change value is sufficient that the throttle gate should be adjusted, the microcomputer generates a pulse having a duration corresponding to the desired amount of throttle gate position change. If the desired change is in a different direction than the previous position change, a fixed additional pulse width can be added at steps 152 and 154 in order to compensate for the mechanical hysteresis or "lost motion" characteristics of the throttle gate valve. These steps are performed in the equivalent of block 43 in FIG. 2. The control pulse is then sent to the hydraulic cylinders 56 to control the throttle gate position in a well-known manner.

If the mold level error signal $E_{ML}$ is determined at step 140 to exceed its predetermined limits, the microcomputer assumes that a problem exists in the flow regulation system and begins to regulate the casting speed according to the program of FIG. 4 while maintaining the throttle gate 28 in its most recent position. The microcomputer sets a speed flag at step $158_1$ to stop the flow control and at step $158_2$ generates a speed error signal $E_{SP}$ in accordance with the mold level error which is the actual level minus the desired level (set point). A speed control PID algorithm is followed in step $158_3$ in substantially the same manner as the flow control algorithm in step 142, and an analog signal representing the desired change in the casting speed is generated in step 158₄.

The casting speed is normally maintained at a constant value by the servo loop comprising a tachometer 60 for generating a signal corresponding to the actual casting speed, a comparator 62 for comparing the actual casting speed with a desired speed reference signal to generate an error signal, a line-drive regulator 64 for receiving the output of the comparator 62 and generating a drive signal which increases or decreases in accordance with the output of the comparator 62, and a casting speed drive motor 66 for controlling the strand withdrawal rate. During the speed control mode, the microcomputer follows the PID algorithm in generating a speed change signal in accordance with the mold level error signal, and this speed change signal is then provided as a further input to the comparator 62 to provide an offset adjustment to the speed control signal.

When the speed flag is set at step 158₁, an alarm is sounded to notify the operator that speed control is now in operation. The speed flag will remain set until the operator has corrected the problem and has reset the flow control system. As long as the speed flag is set, the microcomputer will exit the flow control program at step 170 in FIG. 4 and will proceed to the speed control program 158₁ in FIG. 4.

A feature of the above-described system is that there is no requirement for a tundish throttle gate position feedback signal, since the control system is concerned with desired changes or adjustments to the throttle gate position rather than with the absolute gate position itself. However, it would be possible to provide a throttle gate position signal and to use this throttle gate position signal in the tundish flow control algorithm 42 for diagnostic purposes. More particularly, if the microcomputer determines in step 30 (FIG. 2) that the mold level is continuing to decrease while simultaneously determining from the gate position sensor 72 that the tundish throttle gate is open very wide, the microcomputer will know that an abnormal condition exists, e.g. excessive clogging of the throttle gate which will decrease the effective gate opening. Conversely, a detected increase in the mold level at a closed-down position of the throttle gate may indicate excessive corrosion of the throttle gate opening.

As described above, an essential feature of the present invention is the accurate detection of the level of liquid in the mold. This can be done in any one of a number of known ways, but is preferably implemented in a digital manner by scanning a plurality of thermoprobes as disclosed in copending and commonly assigned applications Ser. Nos. 479,398 filed Mar. 28, 1983 and 480,988 filed Mar. 31, 1983.

The control system according to the present invention may also implement high and low alarm limits and a breakout alarm. The high-low alarm limit program may be as illustrated in flow chart form in FIG. 5 and may run, e.g., once per second. In this program, the microcomputer reads the calculated mold level every second and compares it with a high-level alarm point and a low-level alarm point. If either of these two alarm limits are exceeded, the microcomputer sets the appropriate flag. If the alarm limits are not exceeded, the program then resets the flag.

In the breakout alarm program illustrated in flow chart form in FIG. 6, the rate of drop of the mold level is compared with the casting speed. If the mold level is dropping at a rate faster than is appropriate for a particular casting speed and if the absolute level is below a predetermined level, a breakout alarm flag is set. This program may also be run once per second.

As will be appreciated from the above description, the present invention provides a significant improvement in a mold level control system in that the detected mold level error is used to calculate an amount of throttle gate adjustment desired, and a control pulse having a width corresponding to the desired throttle gate movement is generated. The throttle gate can thus be moved directly from its present position to the desired position in response to a single control signal. This is in contrast to prior art techniques such as that disclosed in the above-cited U.S. Pat. No. 3,300,820 wherein each control signal moves the throttle gate by a predetermined amount and a plurality of control signals must be generated to achieve the desired movement, with the mold level being detected between each control signal pulse thereby resulting in an excessively slow response.

Further, there is an inherent delay in the response of the electro-mechanical system components to a control signal propagating through the system. In a relay, for example, a finite period of time is required for the current through the relay coil to build up after the leading edge of a control pulse. This delay will slow the response time of the control system, and a system relying on a series of pulses to implement control will experience significant response time limitations. With the control technique according to the present invention, a single control pulse is used to move the throttle gate to the desired position, and response time is greatly improved.

We claim:

1. In a continuous casting apparatus of the type wherein liquid metal is supplied from a liquid reservoir to a mold through a valve mechanism, said valve mechanism having a movable valve member the position of which determines the rate at which said liquid is supplied to said mold, detection means for detecting the level of liquid in said mold, comparison means for comparing the detected liquid level with a desired level to generate an error signal, control signal generating means for generating a control signal in response to said error signal and control means for moving said valve member in response to said control signal, said control signal generating means comprising:

first means responsive to said error signal for generating a first signal corresponding to a desired change in the position of said valve member, said first means comprising means for receiving a sequence of said error signals and for calculating a value FO according to:

$$FO = KG[(E1-E2) + KI(E1) + KD(E1 - 2E2 + E3)]$$

where E1, E2 and E3 are consecutive error signals and KG, KI and KD are predetermined constants; and second means responsive to the value of said first signal for generating said control signal having a duration corresponding to said first signal.

2. A continuous casting apparatus as defined in claim 1, wherein said control means moves said valve member at a predetermined rate during the presence of said control signal, whereby the movable valve member moves a distance proportional to the duration of said control signal.

3. A continuous casting apparatus as defined in claim 1, wherein said first means further comprises means for calculating a pulse duration signal PD corresponding to said first signal, said pulse duration signal PD being calculated substantially as follows:

$$PD = (FO + PT + FP) \times T_{cm}$$

where PT is a compensation factor for compensating for a delay time between the commencement of said control signal and movement of said valve member, FP is a compensation factor for compensating for free play or the like encountered during a change in direction of movement of said valve member, and $T_{cm}$ is a calibrated movement time of said control means, i.e. the amount of time required by said control means to move said valve member through a predetermined distance.

4. A continuous casting apparatus as defined in claim 1, wherein a cast strand is withdrawn from said mold at a casting speed, said apparatus further comprising:
   limit detection means for comparing said error signal to at least one limit value and for providing an output signal when said error signal exceeds said at least one limit value; and
   speed control means responsive to said output signal from said limit detection means for adjusting said casting speed.

5. A continuous casting apparatus as defined in claim 1, further comprising reservoir level detection means for detecting changes in the level of liquid in said reservoir and for generating a signal DHD corresponding to the present value and direction of change of the reservoir level, and means for calculating a sum (FO+DHD) as said first signal.

6. In a device of the type wherein a liquid is supplied from a liquid supply to a liquid container through a valve mechanism having a movable valve member the position of which determines the rate at which said liquid is supplied to said container, a method of controlling the level of liquid in said container, said method comprising the steps of:
   detecting the level of said liquid in said container;
   generating an error signal corresponding to the difference between the detected liquid level and a reference level;
   calculating a first signal corresponding to a desired change in the position of said valve member, including the step of calculating a value FO according to the following equation:

$$FO = KG[(E1 - E2) + KI(E1) + KD(E1 - 2E2 + E3)]$$

where E1, E2 and E3 are consecutive error signals corresponding to the difference between the detected liquid level and said reference level and KG, KI and KD are predetermined constants;
   generating a control signal having a duration corresponding to the value of said first signal; and
   moving said valve member by an amount proportional to the duration of said control signal.

7. A method as defined in claim 6, wherein said calculating step further comprises calculating a pulse duration signal PD corresponding to said first signal, said pulse duration signal PD being calculated according to the following equation:

$$PD = (FO + PT + FP) \times T_{cm}$$

where PT is a compensation factor for compensating for a delay time between the commencement of said control signal and movement of said valve member, FP is a compensation factor for compensating for free play or the like encountered during a change in direction of movement of said valve member, and $T_{cm}$ is a calibrated movement time of said control means, i.e. the amount of time required by said control means to move said valve member through a predetermined distance.

* * * * *